United States Patent Office 2,786,864
Patented Mar. 26, 1957

2,786,864

TRIISOCYANATODIPHENYL ETHERS AND SULFIDES

Walter V. Wirth, Woodstown, N. J., and Stanley Earl Krahler, Wilmington, Del., assignors to E. I. du Pont de Nemours and Company, Wilmington, Del., a corporation of Delaware No Drawing. Application August 26, 1955,
Serial No. 530,883

3 Claims. (Cl. 260—453)

This invention is directed to new compositions of matter for use in the formulation of adhesives and network-extending agents in the preparation and curing of resins, plastics and elastomers. Recent developments in resins, plastics, elastomers and synthetic fibers have resulted in creased demand for polyfunctional organic isocyanates. Diisocyanates are widely applied in syntheses and curing of linear polyurethanes and related structures, and in the bonding of various materials containing active hydrogen such as polyamides, to elastomers and fibers; however, they often fail to confer three-dimensional stability to the finished product. Trifunctional isocyanates are superior in this respect used alone or in combination with diisocyanates, particularly as chain-extending and network-extending agents for polymeric materials containing active hydrogen, such as is furnished by —OH, —SH and —NH groups. These trifunctional isocyanates are particularly suitable for the production of polyurethane-based resilient foams.

Known triisocyanates are unsatisfactory for commercial use. Potentially valuable materials, such as toluene-2,4,6-triisocyanate and the 2,4,6-triisocyanatodiphenyl ethers have the serious drawback of being derived from explosive trinitro compounds. Preparation of the necessary triamino intermediates from these explosive trinitro compounds is inherently hazardous and uneconomical on a commercial scale. In addition, triisocyanatodiphenyl methanes, such as the 2,4,4'-triisocyanato- and the 2,4,4'-triisocyanato-5-methyl compounds are commercially unfeasible because of the difficulties involved in preparing the corresponding triamines in good yield and in a satisfactory state of purity.

It is an object of this invention to provide useful organic isocyanates which may be prepared easily and economically from available low cost starting materials.

It is a further object of this invention to provide diphenyl ether and diphenyl sulfide triisocyanates, which are network-extending agents for resins, plastics and elastomers, containing free functional groups capable of reacting with isocyanate groups.

Another object of the present invention is to provide triisocyanatodiphenyl ethers and sulfides which are useful in the formulation of adhesives and in the production of polyurethane-based resilient foams.

The triisocyanates of the present invention are represented by the formula

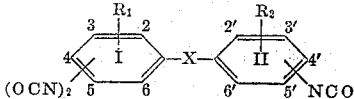

in which X is oxygen or sulfur, and $R_1$ and $R_2$ are hydrogen, lower-alkyl, lower-alkoxyl, or chloro groups; the two isocyanato groups on phenyl ring I are positioned other than ortho to one another, and at least one of the 2,6,2' and 6' positions is unsubstituted.

The triisocyanates of this invention are the triisocyanato-diphenyl ethers and thioethers and their ring-alkylated, alkoxylated and chlorinated derivatives.

The single isocyanate group of phenyl-ring II of the structural formula encompassing compounds within the scope of the present invention may be on any of the unsubstituted carbon atoms.

However, the two isocyanate groups of ring I may occupy only the 2,4, 2,5, 2,6 and 3,5-positions, that is, they are meta or para to one another. The preferred arrangements for the isocyanate groups are 2,2',4 and 2,4,4', preferably in those compounds where $R_1=R_2=$hydrogen, and, in this case, most preferably where X represents oxygen as in diphenyl ether 2,2',4-triisocyanate and in the corresponding 2,4,4'-triisocyanate.

The above triisocyanates may also be nuclear-substituted by lower-alkyl, lower-alkoxyl, or chloro groups. Lower alkyl being an alkyl radical having 1 to 4 carbon atoms, i. e., methyl, ethyl, propyl, and butyl radicals, preferably methyl. Similarly, lower-alkoxyl refers to methoxy, ethoxy, propoxy and butoxy radicals.

There may be only one of these alkyl or alkoxyl groups on a phenyl ring, and when there are two such groups in the molecule, they may be the same or different alkyl and/or alkoxyl groups. Similarly, those triisocyanates which are prepared starting from intermediates containing nuclear chloro substituents may possess a chloro group in one or both phenyl rings; there may be a chloro group in one ring and an alkyl or alkoxyl group in the other phenyl ring. The substituent, whether it be chloro, alkyl or alkoxyl, may occupy any nuclear position not already bearing an isocyanate group as long as at least one position ortho to the ether or sulfide link remains open. This is desirable, for the 2,2',6,6'-tetra-substituted diphenyl ethers and diphenyl sufides, which, because of the steric requirements of the groups, are less easily synthesized and are rather sluggish in chemical reactions designed to exploit their utility.

Desirable diphenyl ethers and sulfides are those carrying the following substituents:

2,3',4-triisocyanato-4'-$R_2$, where $R_2$ is methyl, methoxyl, or chloro; 2,4,4'-triisocyanato-3'-$R_2$, where $R_2$ is methyl, methoxyl, or chloro; 2,4,4'-triisocyanato-5-$R_1$, where $R_1$ is methyl, methoxyl, or chloro; 2,2',4-triisocyanato-5-$R_1$, where $R_1$ is methyl, methoxyl or chloro; 2,4,4'-triisocyanato-6-chloro; 2,3',4-triisocyanato-4',5-dimethyl-; 2,4,4'-triisocyanato-3'-methoxy-5-methyl-; 2,4,4'-triisocyanato-3',5-dichloro-; 2,2',4-triisocyanato-5,5'-dichloro.

In the above compounds, the two NCO groups of ring I are in the 2,4-positions. This arrangement is desired because these triisocyanates are obtained from readily available intermediates having a nitrogen atom at these positions.

However, the 2,5, 2,6 and 3,5-combinations in ring I, though less desirable from the standpoint of ease of preparation, are also within the scope of this invention. Among those having such arrangements are: 2,4',5-triisocyanato-2',4-dimethyldiphenyl ether, 2',3,5-triisocyanato-4'-methyldiphenyl ether, 2,3',6-triisocyanato-4'-methoxydiphenyl ether and the corresponding diphenyl sulfides.

The present novel triisocyanates are obtained from the corresponding triamines according to the usual commercial method of phosgenation, such as (a) cold phase-hot phase phosgenation; (b) the "hydrochloride process" involving phosgenation of the corresponding amine hydrochloride; (c) the continuous process involving simultaneous addition of separate streams of phosgene and triamine (dissolved in an inert solvent) to a reactor containing inert solvent. Suitable solvents for these processes are nitrobenzene, chlorobenzene, o-dichlorobenzene, s-tetra-chloroethane, and the like.

The intermediates for the present compounds are triaminodiphenyl ethers and sulfides and their ring alkylated and alkoxylated derivatives which are obtained on reduction of the corresponding trinitro-, or dinitromonoamino-, or diamino mononitro-compounds which may be prepared by reacting a salt of an appropriately substituted phenol or thiophenol with an arylhalide having at least one nitro group ortho or para to the halogen.

These methods also afford the halogenated triaminodiphenyl ethers and thioethers as intermediates for triisocyanates: reaction of 4-chloro-3-nitrophenol (as the sodium salt) with 2,4-dinitro-5-methoxychlorobenzene yields 2,3',4-trinitro-4'-chloro-5-methoxydiphenyl ether; sodium 4-chloro-2-nitrothiophenoxide and 2,4-dinitrochlorobenzene yield 2,2',4-trinitro-4'-chlorodiphenyl sulfide; 1,3-dichloro-4,6-dinitrobenzene reacts with one equivalent of sodium 3-chloro-4-nitrophenol to form 2,4,4'-trinitro-3',5-dichlorodiphenyl ether; similarly 3-chloro-4-aminophenol (as the sodium salt) condenses with 2,4-dinitrochlorobenzene to yield 4-amino-3-chloro-2',4'-dinitrodiphenyl ether. Chemical reduction with iron, or with stannous chloride, or catalytic reduction with hydrogen yields the corresponding halogenated triaminodiphenyl ethers and sulfides from which on phosgenation are produced the chlorinated triisocyanates. These triisocyanates are free from isomers and have chloro groups in predetermined positions.

Another method of introducing chlorine into the molecule is that of direct chlorination. Molecular chlorine is known to chlorinate aromatic isocyanates in the nucleus, predominantly at positions ortho and/or para to the isocyanato group or groups. Applying this reaction to 2,4,4'-triisocyanatodiphenyl ether, using 1 to 2 molar equivalents of chlorine, produces mono- and dichlorinated derivatives. Other valuable mono- and dichlorinated triisocyanates are also obtained from diphenyl ether triisocyanates containing alkyl and/or alkoxyl groups. If desired, mono- and dichloro-diphenyl ether triisocyanates prepared from intermediates containing chlorine may be further chlorinated. Up to three chloro groups can be introduced directly into the diphenyl ether residue in this way; however, 1 to 2 is the preferred total number of chlorine atoms in the molecule.

The preferred compounds for general use are 2,2',4- and 2,4,4'-triisocyanatodiphenyl ethers. The alkyl, alkoxyl and chloro substituted compounds are also useful because of their modified reactivities. In 2,4,4'-triisocyanatodiphenyl ether, for example, the 2-NCO group, being adjacent (ortho) to the functional ether link is somewhat hindered in its reactivity whereas the other two NCO groups are free or unhindered. If methyl groups, for example, are now introduced at the 3',5-positions the NCO groups at the adjacent 4 and 4' positions also become somewhat hindered and the reactivity of each group and of the molecule as a whole is lessened. Therefore, in being able to modify the relative reactivity of each isocyanto group and of the molecule as a whole by strategically placed substituents, we are able to provide triisocyanates for specific needs, e. g., as agents for rapid or slow curing of polymeric material containing active hydrogen.

The triisocyanates of the present invention have the significant advantage over the prior art triisocyanates in being economical and safely prepared from readily available and inexpensive intermediates. In contrast to these novel triisocyanates toluene-2,4,6-triisocyanate and such triisocyanates as diphenyl ether 2,4,6-triisocyanates are impractical as they are derived from trinitro bodies known to be explosive, thus requiring that special precautions be taken which inherently means high investment and operating costs.

The following examples illustrate the preparation of the diphenyl ether and diphenyl sulfide diisocyanates; all quantities are in parts by weight:

Example 1

107.5 parts of 2,4,4'-triaminodiphenyl ether is dissolved in 1400 parts of chlorobenzene at 100° C. under nitrogen. This solution is then added over 15 minutes to a vigorously agitated solution consisting of 158.4 parts of phosgene and 690 parts of chlorobenzene, the temperature of the reaction mass being maintained at —5 to +20° C. The slurry produced is heated under agitation to 85° C. and a slow stream of phosgene is passed through it for 3 hours at 85–96° C. Phosgene is fed in for 11 hours longer while the temperature is gradually raised from 85 to 130° C. The charge is freed of excess phosgene and hydrogen chloride by passing nitrogen through it. The solution is filtered to remove a small quantity of suspended solid and the chlorobenzene is stripped from the filtrate under reduced pressure. The residue is distilled at low pressure: 2,4,4'-triisocyanatodiphenyl ether distills at 168.5–181° C. at 0.3 mm. as a colorless oil, solidifying to a colorless solid, melting at 69.5 to 70.5° C.; the yield is 75% of theory.

Employing the same general technique, 2,4,4'-triaminodiphenyl ether is also phosgenated to 2,4,4'-triisocyanatodiphenyl ether (boiling range 180° C. at 0.65 mm. to 187.5° C. at 0.8 mm., melting range 68.5–70° C.) in nitrobenzene as the solvent.

Example 2

Solutions of 107.5 parts of 2,2',4-triaminodiphenyl ether in 1400 parts of chlorobenzene and 158.4 parts of phosgene in 690 parts of chlorobenzene are treated as described above in Example 1. Solution of the triamine-phosgene complex is complete after approximately 15 hours of phosgenation at 85–128° C. The triisocyanate is isolated by distillation in 45% yield, as a colorless oil, boiling range 170–178° C. at 0.5 mm., which solidifies on cooling and melts at 62.5–63.5° C.

If the phosgenation is carried out in 1,1,2,2,-tetrachloroethane, using essentially the same proportions of reactants and solvent and under essentially the same conditions, 2,2',4-triisocyanatodiphenyl ether is obtained in 62% yield.

Example 3

104 parts of 2,2',4-triaminodiphenyl sulfide is dissolved in 1625 parts of o-dichlorobenzene at 95° C. under nitrogen. 138.6 parts of phosgene is dissolved in 815 parts of o-dichlorobenzene at —15 to 0° C. The triamine solution is added to the phosgene solution at —10 to +20° C. over 10 minutes, with vigorous agitation, a grayish precipitate of triamine-phosgene complex separating immediately. The suspension is heated first to 70° C., and passage of a slow stream of phosgene is begun, and then over 2.5 hours to reflux; after 2 hours of phosgenating at 177–181° C. the solid is completely dissolved. The solution is blown with nitrogen to remove hydrogen chloride and excess phosgene and then cooled to 100° C. "Cellite" (a filter-aid) and decolorizing carbon, 10 parts of each, are added and the mixture is filtered hot. o-Dichlorobenzene is distilled at reduced pressure and the residue is distilled at low pressure to give 2,2',4-triisocyanatodiphenyl sulfide (colorless oil, boiling at approximately 184° C. at 0.35 mm., which solidifies to a colorless solid melting at 64.5–67.5° C.) in a yield of 63% of theory.

Recrystallization of the triisocyanate from dry hexane gives colorless crystals melting at 63.5–65.0° C.

Example 4

Following the method and the procedure given above in Example 3 for the phosgenation of 2,2',4-triaminodiphenyl sulfide, phosgenation of 2,4,4'-triaminodiphenyl sulfide in o-dichlorobenzene proceeds analogously. 2,4,4'-triisocyanatodiphenyl sulfide is obtained as a green-tan oil, boiling from 172° C. at 0.3 mm. to 188° C. at 0.35 mm. On cooling, the oil solidifies to a green-tan solid. Recrystallization from dry hexane gives a colorless solid, melting range 79–80.5° C.

Example 5

A solution of 103 parts of 2,3',4-triamino-4'-methyldiphenyl ether in 1625 parts of o-dichlorobenzene, prepared at 90° C. under nitrogen, is added to an agitated solution of 138.6 parts of phosgene in 810 parts of o-dichlorobenzene at −10 to +15° C. The gray-brown slurry produced is heated to 70° C. and a fairly rapid flow of phosgene is introduced. The charge is heated to 170–175° over 1 hour. After 1.5 hours the complex is completely dissolved and there is essentially no hydrogen chloride in the off-gas from the reactor. After the charge is blown with nitrogen and freed of solvent by distillation under reduced pressure, the residue is distilled under low pressure. 2,3',4-triisocyanato-4'-methyldiphenyl ether is isolated as a substantially colorless oil boiling from 180.5 at 0.65 mm. to 189.5° C. at 0.75 mm. It solidifies on cooling and melts at 78–79.5° C. The yield is 63% of theory.

Example 6

85 parts of 2,3',4-triamino-4'-methoxydiphenyl ether, dissolved in 1300 parts of o-dichlorobenzene by heating to 85° C. under nitrogen, is added to an agitated solution of 120 parts of phosgene in 780 parts of o-dichlorobenzene at −15° to +10° C. As before, the slurry is heated to 70°. A stream of phosgene is introduced while the charge is heated to 178° C. and held at this temperature for about 3 hours. After the charge is blown with nitrogen and stripped of solvent it is distilled to give 2,3',4-triisocyanato-4'-methoxydiphenyl ether as a substantially colorless oil boiling from 193 to 199° C. at 0.35 mm. The oil solidifies on cooling; melting range 91–93° C.; the yield is 76% of theory.

Example 7

112.3 parts of 2,4,4'-triamino-3'-chlorodiphenyl ether is dissolved in 1625 parts of o-dichlorobenzene at 90° C. under nitrogen. This solution is added to 138.6 parts of phosgene contained in 810 parts o-dichlorobenzene at −15° to 0° C. As described above in Example 6, the slurry is heated to 70° and then to 178° C. in a stream of phosgene until the solid dissolves (ca. 2 hrs. at reflux). The triisocyanate is isolated in the usual way (Example 6): 2,4,4'-triisocyanato-3'-chlorodiphenyl ether is obtained in 74% yield, as a substantially colorless material, boiling from 166° C. at 0.1 mm. to 174° C. at 0.15 mm. and melting from 72 to 74° C.

Example 8

97.7 parts (0.333 mole) of 2,4,4'-triisocyanatodiphenyl ether and 1 part of iodine are dissolved in 825 parts of chlorobenzene. 49.5 parts (0.698 mole) of chlorine is bubbled into the charge over 1.75 hours, the temperature being held at 22–26° C. The mixture is stirred at 25–30° C. for 1.5 hours after all the chlorine has been added; a grayish-brown precipitate separates during this period. While a slow stream of nitrogen is passed through the charge it is heated to 120° C. and held at 120 ±5° C. for 2 hours. The solvent is removed by distillation at atmospheric pressure and the residual material is distilled at low pressure. 105 parts of a substantially colorless oil, boiling from 182° C. at 0.24 mm. to 194° C. at 0.4 mm., is obtained, which solidifies on cooling and melts from 73 to 75° C. Chemical analysis of the product shows it to be 2,4,4'-triisocyanatodiphenyl ether in which approximately 1.4 of the hydrogen atoms are replaced by chlorine.

We claim:
1. The compound

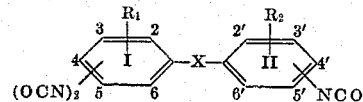

wherein X is taken from the group consisting of oxygen and sulfur, $R_1$ and $R_2$ are taken from the group consisting of hydrogen, chlorine, lower-alkyl and lower-alkoxyl groups, the isocyanate groups of phenyl ring I being other than ortho to one another and at least one of the 2,6,2' and 6' positions being unsubstituted.

2. The compound 2,2',4-triisocyanatodiphenyl ether.
3. The compound 2,4,4'-triisocyanatodiphenyl ether.

No references cited.